US009209686B2

(12) United States Patent
Miura et al.

(10) Patent No.: US 9,209,686 B2
(45) Date of Patent: Dec. 8, 2015

(54) DC-DC CONVERTER AND SEMICONDUCTOR INTEGRATED CIRCUIT

(71) Applicant: Kabushiki Kaisha Toshiba, Minato-Ku, Tokyo (JP)

(72) Inventors: Tsukasa Miura, Yokohama (JP); Hideki Kimura, Yokohama (JP); Sadao Ikeda, Chigasaki (JP)

(73) Assignee: Kabushiki Kaisha Toshiba, Minato-Ku, Tokyo (JP)

( * ) Notice: Subject to any disclaimer, the term of this patent is extended or adjusted under 35 U.S.C. 154(b) by 117 days.

(21) Appl. No.: 14/184,234

(22) Filed: Feb. 19, 2014

(65) Prior Publication Data

US 2015/0069988 A1      Mar. 12, 2015

(30) Foreign Application Priority Data

Sep. 12, 2013 (JP) .................................. 2013-189726

(51) Int. Cl.
| H02M 3/156 | (2006.01) |
| H02M 1/32 | (2007.01) |
| G05F 1/573 | (2006.01) |
| H02M 1/00 | (2007.01) |

(52) U.S. Cl.
CPC ................ *H02M 3/156* (2013.01); *H02M 1/32* (2013.01); *H02M 2001/0009* (2013.01)

(58) Field of Classification Search
CPC ......... H02H 3/08; H02H 3/087; H03K 17/08; H03K 17/0822; H02M 1/32; H02M 3/156; H02M 3/157; G05F 1/573

USPC ........... 361/87, 93.1, 93.2; 323/282, 284, 285
See application file for complete search history.

(56) References Cited

U.S. PATENT DOCUMENTS

| 8,913,363 | B2 * | 12/2014 | Takata et al. ................. 361/93.2 |
| 2004/0227498 | A1 * | 11/2004 | Okada ........................... 323/285 |
| 2005/0024900 | A1 * | 2/2005 | Hachiya ......................... 363/24 |
| 2006/0077606 | A1 * | 4/2006 | Nakamura .................... 361/93.1 |
| 2007/0121258 | A1 * | 5/2007 | Hachiya ......................... 361/18 |
| 2008/0203984 | A1 * | 8/2008 | Omi .............................. 323/272 |
| 2010/0008106 | A1 * | 1/2010 | Kawabe et al. ............. 363/21.01 |

FOREIGN PATENT DOCUMENTS

| JP | 2004-364448 A | 12/2004 |
| JP | 2006-115596 A | 4/2006 |
| JP | 2007-110803 A | 4/2007 |
| JP | 2008-099440 A | 4/2008 |
| JP | 4107172 B2 | 4/2008 |
| JP | 4308183 B2 | 5/2009 |

* cited by examiner

*Primary Examiner* — Gary L Laxton
(74) *Attorney, Agent, or Firm* — White & Case LLP

(57) ABSTRACT

The DC-DC converter includes a mask controlling circuit that outputs an overcurrent detection mask signal that prescribes a mask period in which the overcurrent detection result signal is masked. The DC-DC converter includes a mask adjusting circuit that adjusts a length of the mask period according to the power supply voltage. The DC-DC converter includes an operation circuit that performs an operation of the overcurrent detection result signal and the overcurrent detection mask signal and outputs an overcurrent controlling signal with the overcurrent detection result signal being masked in the mask period.

20 Claims, 4 Drawing Sheets

DC-DC CONVERTER AND SEMICONDUCTOR INTEGRATED CIRCUIT

CROSS-REFERENCE TO RELATED APPLICATION

This application is based upon and claims the benefit of priority from the prior Japanese Patent Application No. 2013-189726, filed on Sep. 12, 2013, the entire contents of which are incorporated herein by reference.

BACKGROUND

1. Field

Embodiments described herein relate generally to a DC-DC converter and a semiconductor integrated circuit.

2. Background Art

A conventional DC-DC converter provides a mask that temporarily invalidates overcurrent detection in order to prevent erroneous determination of the presence of an overcurrent because of operation noise of a peripheral circuit or erroneous detection of a current flowing through a switch element that occurs when a switching operation occurs.

DETAILED DESCRIPTION

A DC-DC converter according to an embodiment that outputs, at an output terminal, an output voltage obtained by stepping down or boosting a power supply voltage. The DC-DC converter includes a switch element that controls supply of a current to the output terminal. The DC-DC converter includes an overcurrent detecting circuit that compares a detected voltage responsive to a current flowing through the switch element and a reference voltage and outputs an overcurrent detection result signal responsive to a result of the comparison. The DC-DC converter includes a mask controlling circuit that outputs an overcurrent detection mask signal that prescribes a mask period in which the overcurrent detection result signal is masked. The DC-DC converter includes a mask adjusting circuit that adjusts a length of the mask period according to the power supply voltage. The DC-DC converter includes an operation circuit that performs an operation of the overcurrent detection result signal and the overcurrent detection mask signal and outputs an overcurrent controlling signal with the overcurrent detection result signal being masked in the mask period. The DC-DC converter includes an output controlling circuit that performs PWM control on the switch element in such a manner that a feedback signal that is based on the output voltage comes closer to a target value, and forcedly turns off the switch element based on the overcurrent controlling signal.

In the following, embodiments will be described with reference to the drawings. In the embodiments, DC-DC converters that step down or boost a power supply voltage and output the resulting output voltage at an output terminal will be described.

First Embodiment

Figure 1:
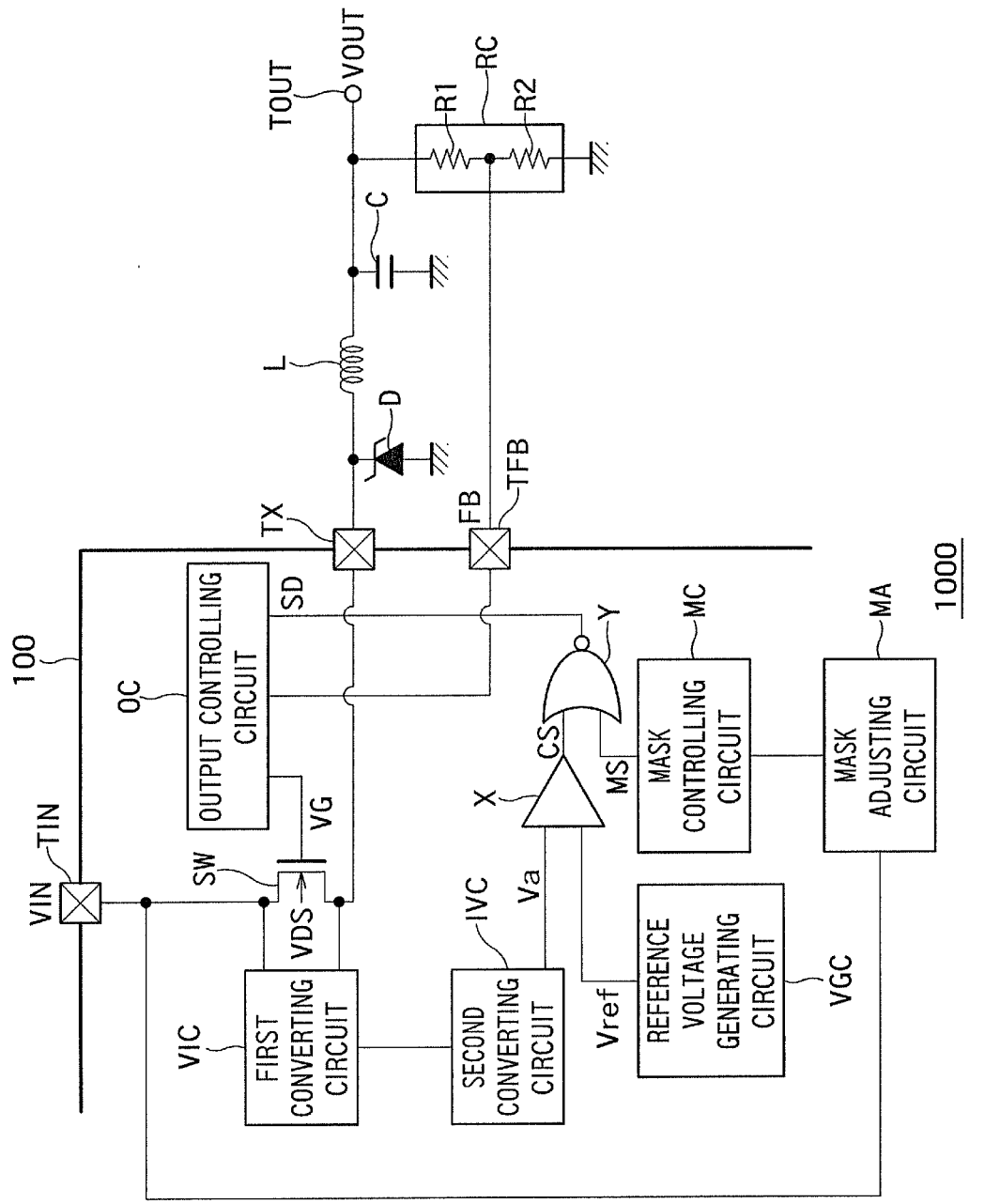
FIG. 1 is a circuit diagram showing an example of a configuration of a DC-DC converter 1000 according to the first embodiment.

In a first embodiment, an example of a configuration of a step-down DC-DC converter will be described. FIG. 1 is a circuit diagram showing an example of a configuration of a DC-DC converter 1000 according to the first embodiment.

As shown in FIG. 1, the DC-DC converter 1000 includes an output terminal "TOUT", a voltage dividing circuit "RC", a coil "L", a capacitor "C", a diode "D" and a semiconductor integrated circuit 100, for example. The semiconductor integrated circuit 100 includes an input terminal "TIN", a control terminal "TX", a feedback terminal "TFB", a switch element (in this embodiment, an n-channel MOS transistor, for example) "SW", an overcurrent detecting circuit (in this embodiment, a comparator, for example) "X", a mask controlling circuit "MC", a mask adjusting circuit "MA", an operation circuit "Y", an output controlling circuit "OC", a reference voltage generating circuit "VGC", a first converting circuit "VIC" and a second converting circuit "IVC".

The DC-DC converter 1000 outputs an output voltage "VOUT" obtained by stepping down a power supply voltage "VIN" at the output terminal "TOUT".

As shown in FIG. 1, the coil "L" is connected between the output terminal "TOUT" and the control terminal "TX".

The capacitor "C" is connected between the output terminal "TOUT" and a ground.

The diode "D" is connected to the control terminal "TX" at a cathode thereof and to the ground at an anode thereof.

The voltage dividing circuit "RC" is connected between the output terminal "TOUT" and the ground and outputs a voltage obtained by dividing the output voltage "VOUT" as a feedback signal "FB".

As shown in FIG. 1, the voltage dividing circuit "RC" includes voltage dividing resistors "R1" and "R2" connected in series with each other between the output terminal "TOUT" and the ground.

The input terminal "TIN" is connected to one end of a current path of the switch element "SW", and the power supply voltage "VIN" is supplied to the input terminal "TIN".

The control terminal "TX" is connected to another end of the current path of the switch element "SW".

The feedback signal "FB" is supplied to the feedback terminal "TFB".

The switch element "SW" is connected to the input terminal "TIN" at one end (drain) thereof and to the control terminal "TX" at another end (source) thereof. The switch element "SW" receives a gate signal "VG" from the output controlling circuit "OC" at a control terminal (gate) thereof and is PWM-controlled. The switch element "SW" controls supply of a current to the output terminal "TOUT".

The first converting circuit "VIC" detects a potential difference "VDS" between the one end (drain) and the another end (source) of the switch element "SW", converts the potential difference "VDS" into a detected current and outputs the detected current.

The potential difference "VDS" between the one end (drain) and the another end (source) of the switch element "SW" increases as the current flowing through the switch element "SW" increases, and decreases as the current flowing through the switch element "SW" decreases. That is, the potential difference "VDS" is correlated with the current flowing through the switch element "SW". Therefore, an overcurrent flowing through the switch element "SW" can be detected by the potential difference "VDS".

The second converting circuit "IVC" converts the detected current output from the first converting circuit "VIC" described above into a detected voltage "Va" and outputs the detected voltage "Va".

The reference voltage generating circuit "VGC" generates a reference voltage "Vref".

The overcurrent detecting circuit "X" compares the detected voltage "Va" and the reference voltage "Vref" and outputs an overcurrent detection result signal "CS" responsive to a result of the comparison.

For example, in a case where the detected voltage "Va" is lower than the reference voltage "Vref", the overcurrent detecting circuit "X" outputs the overcurrent detection result signal "CS" that prescribes that the detected voltage "Va" is lower than the reference voltage "Vref" (that is, no overcurrent flows through the switch element "SW").

In other words, in a case where the potential difference "VDS" between the one end (drain) and the another end (source) of the switch element "SW" is lower than a overcurrent determination threshold "th2", the overcurrent detecting circuit "X" outputs the overcurrent detection result signal "CS" that prescribes that no overcurrent flows through the switch element "SW".

On the other hand, in a case where the detected voltage "Va" is equal to or higher than the reference voltage "Vref", the overcurrent detecting circuit "X" outputs the overcurrent detection result signal "CS" that prescribes that the detected voltage "Va" is equal to or higher than the reference voltage "Vref" (that is, a overcurrent flows through the switch element "SW").

In other words, in a case where the potential difference "VDS" between the one end (drain) and the another end (source) of the switch element "SW" is equal to or higher than the overcurrent determination threshold "th2", the overcurrent detecting circuit "X" outputs the overcurrent detection result signal "CS" that prescribes that an overcurrent flows through the switch element "SW".

The mask controlling circuit "MC" outputs an overcurrent detection mask signal "MS" that prescribes a mask period in which the comparison result prescribed by the overcurrent detection result signal is masked.

For example, the mask adjusting circuit "MA" adjusts the mask period to a first mask period in a case where the power supply voltage "VIN" is equal to or higher than a switching threshold "th1".

On the other hand, the mask adjusting circuit "MA" adjusts the mask period to a second mask period, which is longer than the first mask period, in a case where the power supply voltage "VIN" is lower than the switching threshold "th1".

The operation circuit "Y" performs an operation of the overcurrent detection result signal "CS" and the overcurrent detection mask signal "MS" and outputs an overcurrent controlling signal "SD" with the comparison result prescribed by the overcurrent detection result signal "CS" being masked (invalidated) in the mask period.

The operation circuit "Y" is a NOR circuit that receives the overcurrent detection result signal "CS" and the overcurrent detection mask signal "MS" and outputs the overcurrent controlling signal "SD", for example.

The output controlling circuit "OC" performs PWM control on the switch element "SW" in such a manner that the feedback signal "FB" based on the output voltage "VOUT" comes closer to a target value. As a result, the output voltage "VOUT" of the DC-DC converter 1000 is maintained at the target value.

Furthermore, the output controlling circuit "OC" forcedly turns off the switch element "SW" based on the overcurrent controlling signal "SD". As a result, the overcurrent is cut off.

In particular, in a period except for the mask period described above, if the overcurrent controlling signal "SD" prescribes the comparison result that the detected voltage "Va" is equal to or higher than the reference voltage "Vref", the output controlling circuit "OC" forcedly turns off the switch element "SW".

The mask period starts when the switch element "SW" is turned on, for example.

The mask period is set to be shorter than a period in which the switch element is continuously in an on state, for example.

Figure 2:
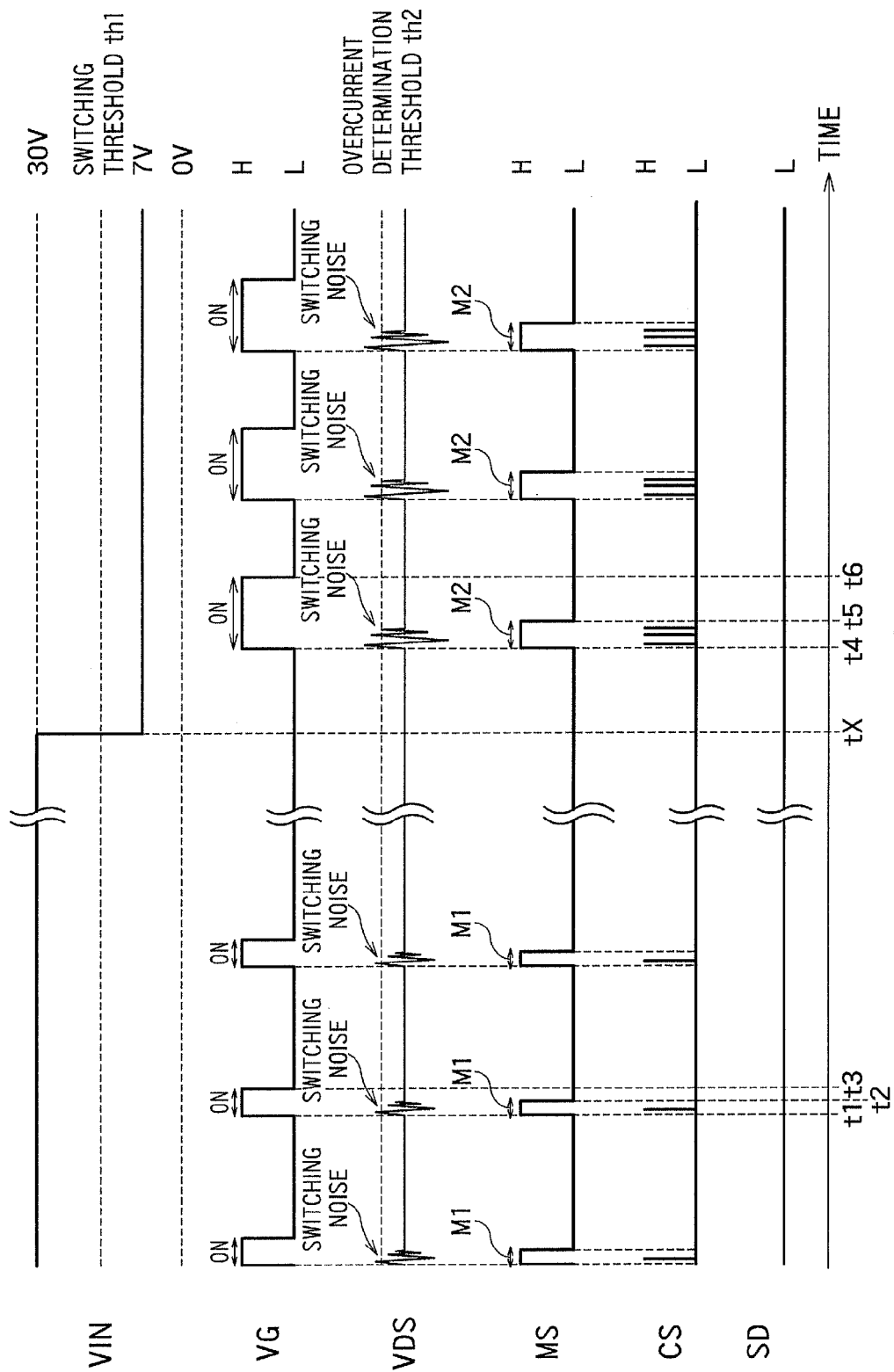
FIG. 2 is a waveform diagram showing examples of signals that occur in operation of the DC-DC converter 1000.

Next, an example of an operation of the DC-DC converter 1000 configured as described above will be described. FIG. 2 is a waveform diagram showing examples of signals that occur in operation of the DC-DC converter 1000.

As shown in FIG. 2, for example, in a period from a time "t1" to a time "t3", when the gate signal "VG" is set at a "High" level under the PWM control, the switch element "SW" is turned on. This involves switching noise superposed on the potential difference "VDS" of the switch element "SW". The power supply voltage "VIN" is high (30 V) (before a time "tx"), and therefore, an on-duty of the switch element "SW" is set low (the period from the time "t1" to the time "t3" is 62.5 ns, for example).

Since the power supply voltage "VIN" (30 V) is equal to or higher than the switching threshold "th1" (before the time "tx"), the mask adjusting circuit "MA" adjusts the mask period to a first mask period "M1" (40 ns, for example).

Therefore, the mask controlling circuit "MC" outputs the overcurrent detection mask signal "MS" (at the "High" level) that prescribes the first mask period "M1" (from the time "t1" to the time "t2") in which the overcurrent detection result signal "CS" is masked.

In the period from the time "t1" to the time "t2", when the potential difference "VDS" becomes equal to or higher than the overcurrent determination threshold "th2", the overcurrent detecting circuit "X" outputs the overcurrent detection result signal "CS" (at the "High" level) that prescribes that an overcurrent flows through the switch element "SW".

The overcurrent detection result signal "CS" at the "High" level occurs in the first mask period "M1". Therefore, the operation circuit "Y" performs an operation of the overcurrent detection result signal "CS" and the overcurrent detection mask signal "MS" and outputs the overcurrent controlling signal "SD" (at a "Low" level) with the overcurrent detection result signal "CS" being masked (invalidated) in the first mask period "M1" (from the time "t1" to the time "t2").

In this way, erroneous detections of an overcurrent due to the switching noise caused by turning on of the switch element "SW" can be reduced.

In a period from a time "t4" to a time "t6", when the gate signal "VG" is set at the "High" level under the PWM control, the switch element "SW" is turned on. This involves switching noise superposed on the potential difference "VDS" of the switch element "SW". The power supply voltage "VIN" is low (7 V) (after the time "tx"), and therefore, the on-duty of the switch element "SW" is set high (the period from the time "t4" to the time "t6" is 290 ns, for example).

Since the power supply voltage "VIN" (7 V) is lower than the switching threshold "th1" (after the time "tx"), the mask adjusting circuit "MA" adjusts the mask period to a second mask period (100 ns, for example), which is longer than the first mask period "M1".

Therefore, the mask controlling circuit "MC" outputs the overcurrent detection mask signal "MS" (at the "High" level)

that prescribes the second mask period "M2" (from the time "t4" to a time "t5") in which the overcurrent detection result signal "CS" is masked.

In the period from the time "t4" to the time "t5", when the potential difference "VDS" becomes equal to or higher than the overcurrent determination threshold "th2", the overcurrent detecting circuit "X" outputs the overcurrent detection result signal "CS" (at the "High" level) that prescribes that an overcurrent flows through the switch element "SW".

The overcurrent detection result signal "CS" at the "High" level occurs in the second mask period "M2". Therefore, the operation circuit "Y" performs an operation of the overcurrent detection result signal "CS" and the overcurrent detection mask signal "MS" and outputs the overcurrent controlling signal "SD" (at the "Low" level) with the overcurrent detection result signal "CS" being masked (invalidated) in the second mask period "M2" (from the time "t4" to the time "t5").

In this way, erroneous detections of an overcurrent due to the switching noise caused by turning on of the switch element "SW" can be reduced.

As described above, since the length of the mask period is controlled to change depending on the power supply voltage "VIN", an overcurrent can be detected with the optimum mask period for the use condition.

In particular, when the power supply voltage "VIN" is low, the step-down ratio is low, so that the on-time of the switch element "SW" is long. In this case, a sufficient overcurrent detection period can be assured even if the mask period is set long. Therefore, under a condition that the power supply voltage "VIN" is low, the mask period can be set long, thereby increasing the speed of the DC-DC converter and reducing erroneous detections of an overcurrent.

As described above, the DC-DC converter according to the first embodiment can reduce erroneous detections of an overcurrent.

Second Embodiment

In the first embodiment described above, an example of the configuration of a step-down DC-DC converter has been described.

In the first embodiment, the potential difference "VDS" between the one end (drain) and the another end (source) of the switch element "SW" correlated with the current flowing through the switch element "SW" is detected. However, the voltage at the one end (drain) of the switch element "SW" is also correlated with the current flowing through the switch element "SW".

In view of this, in a second embodiment, an example of a configuration of a step-down DC-DC converter that uses the voltage at the one end (drain) of the current path of the switch element "SW" as the detected voltage "Va" will be described.

Figure 3:
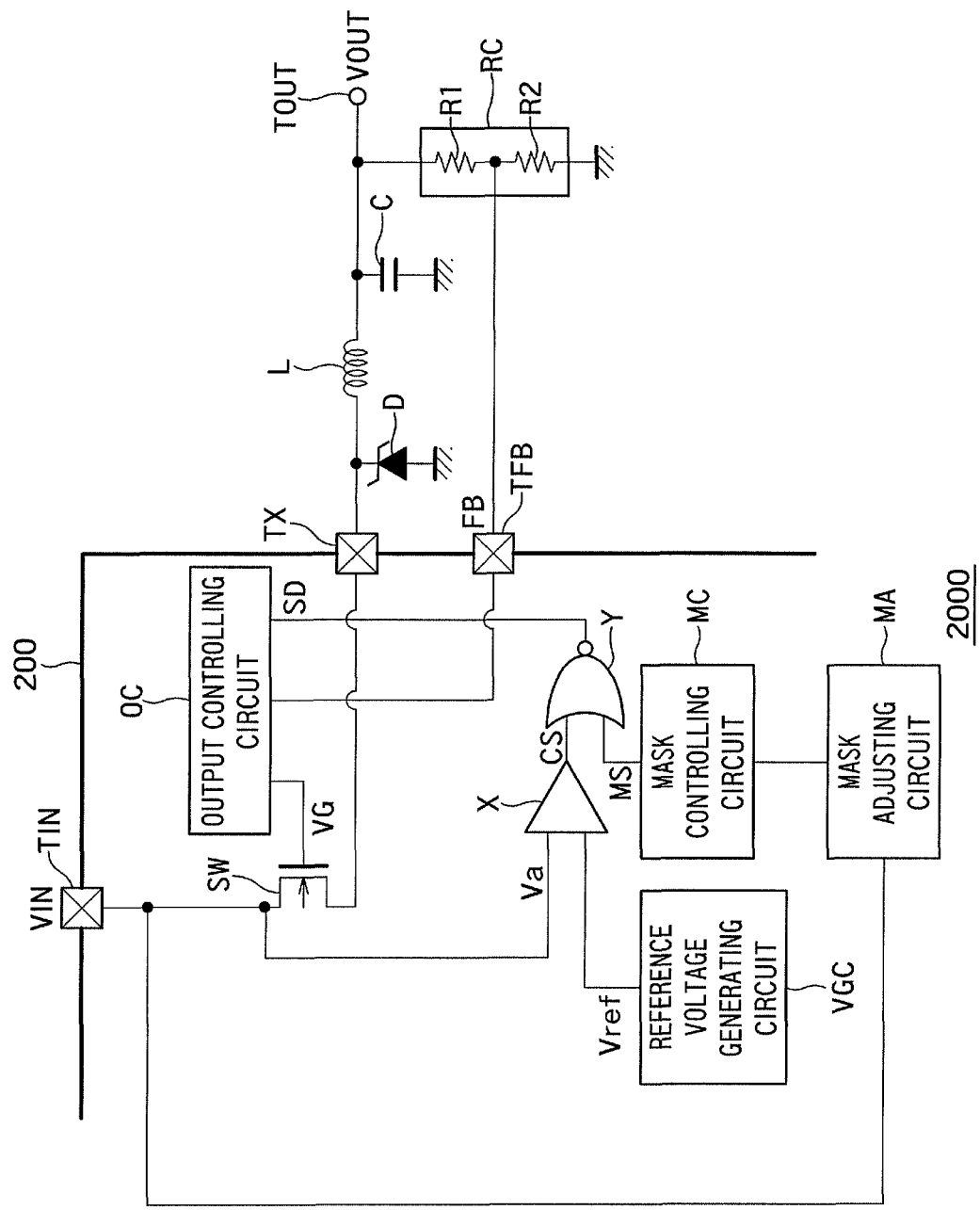
FIG. 3 is a circuit diagram showing an example of a configuration of a DC-DC converter 2000 according to the second embodiment.

FIG. 3 is a circuit diagram showing an example of a configuration of a DC-DC converter 2000 according to the second embodiment. In FIG. 3, the same reference numerals as those shown in FIG. 1 denote the same components as those in the first embodiment, and descriptions thereof will be omitted.

As shown in FIG. 3, the DC-DC converter 2000 includes the output terminal "TOUT", the voltage dividing circuit "RC", the coil "L", the capacitor "C", the diode "D" and a semiconductor integrated circuit 200, for example. The semiconductor integrated circuit 200 includes the input terminal "TIN", the control terminal "TX", the feedback terminal "TFB", the switch element (in this embodiment, an n-channel MOS transistor, for example) "SW", the overcurrent detecting circuit (in this embodiment, a comparator, for example) "X", the mask controlling circuit "MC", the mask adjusting circuit "MA", the operation circuit "Y", the output controlling circuit "OC" and the reference voltage generating circuit "VGC".

That is, the DC-DC converter 2000 (semiconductor integrated circuit 200) differs from the DC-DC converter 1000 (semiconductor integrated circuit 100) in that the first converting circuit "VIC" and the second converting circuit "IVC" are omitted.

As described above, the voltage at the one end (drain) of the switch element "SW" is also correlated with the current flowing through the switch element "SW".

In view of this, the overcurrent detecting circuit compares the detected voltage "Va" responsive to the current flowing through the switch element "SW" (voltage at the one end (drain) of the switch element "SW") and the reference voltage "Vref", and outputs the overcurrent detection result signal "CS" responsive to a result of the detection.

That is, as described above, in the second embodiment, the voltage at the one end (drain) of the switch element "SW" is used as the detected voltage "Va".

The remainder of the configuration of the DC-DC converter 2000 is the same as that of the DC-DC converter 1000 according to the first embodiment.

The operation of the DC-DC converter 2000 is also the same as the operation of the DC-DC converter 1000 according to the first embodiment.

That is, as with the DC-DC converter according to the first embodiment, the DC-DC converter according to the second embodiment can reduce erroneous detections of an overcurrent.

Third Embodiment

In the first and second embodiments described above, examples of configurations of step-down DC-DC converters have been described. In a third embodiment, an example of a configuration of a boost DC-DC converter will be described.

Figure 4:
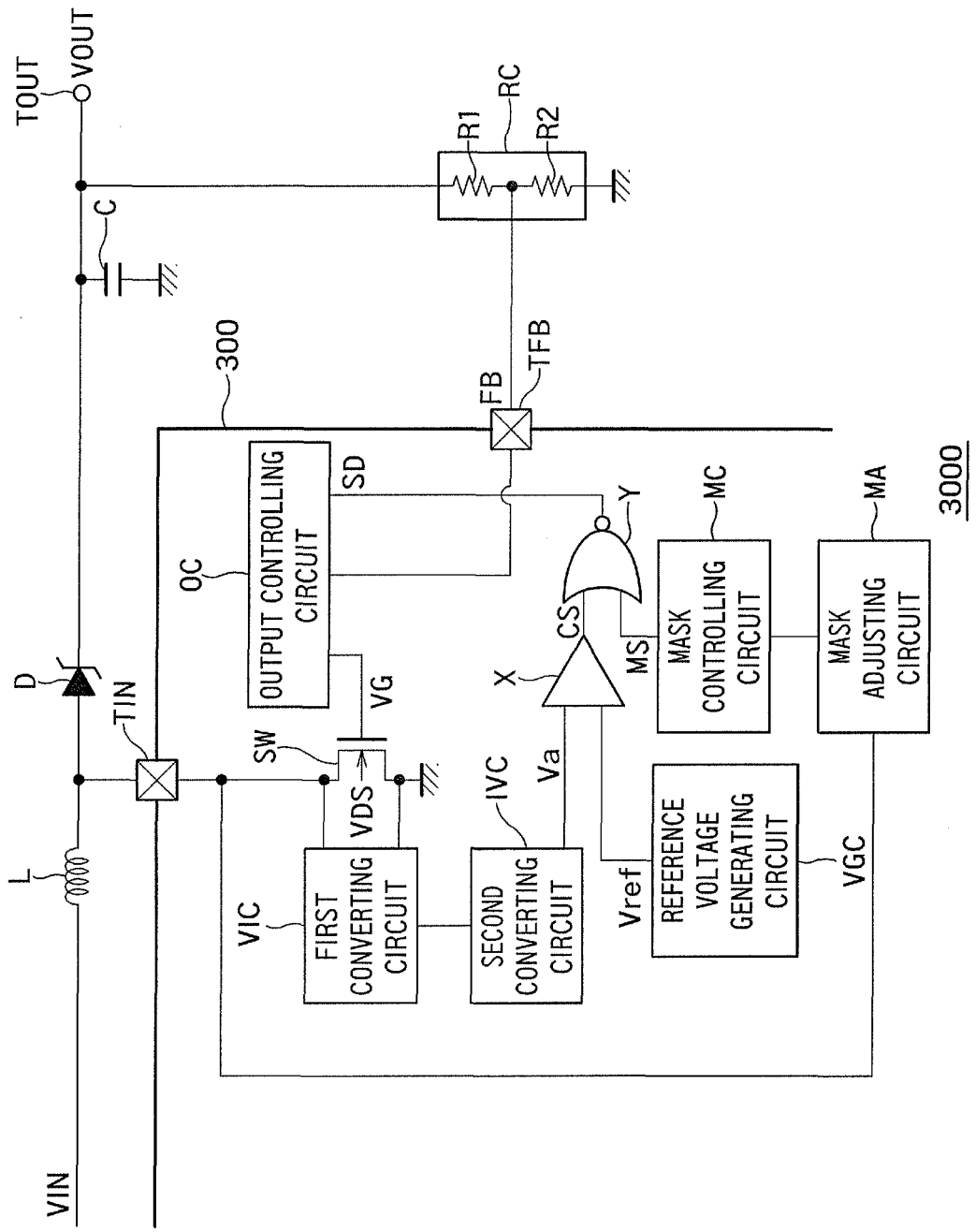
FIG. 4 is a circuit diagram showing an example of a configuration of a DC-DC converter 3000 according to the third embodiment.

FIG. 4 is a circuit diagram showing an example of a configuration of a DC-DC converter 3000 according to the third embodiment. In FIG. 4, the same reference numerals as those shown in FIG. 1 denote the same components as those in the first embodiment, and descriptions thereof will be omitted.

As shown in FIG. 4, the DC-DC converter 3000 includes the output terminal "TOUT", the voltage dividing circuit "RC", the coil "L", the capacitor "C", the diode "D" and a semiconductor integrated circuit 300, for example. The semiconductor integrated circuit 300 includes the input terminal "TIN", the feedback terminal "TFB", the switch element (in this embodiment, a MOS transistor, for example) "SW", the overcurrent detecting circuit (in this embodiment, a comparator, for example) "X", the mask controlling circuit "MC", the mask adjusting circuit "MA", the operation circuit "Y", the output controlling circuit "OC", the reference voltage generating circuit "VGC", the first converting circuit "VIC" and the second converting circuit "IVC".

As shown in FIG. 4, the coil "L" receives the power supply voltage "VIN" at one end thereof.

The diode "D" is connected to another end of the coil "L" at an anode thereof and to the output terminal "TOUT" at a cathode thereof.

The capacitor "C" is connected between the output terminal "TOUT" and the ground.

The another end of the coil "L" is connected to the input terminal "TIN", and the switch element "SW" is connected between the input terminal "TIN" and the ground.

The feedback terminal "TFB" receives the feedback signal "FB".

The voltage dividing circuit "RC" is connected between the output terminal "TOUT" and the ground and outputs a voltage obtained by dividing the output voltage "VOUT" as the feedback signal "FB".

As described above, the DC-DC converter 3000 has a configuration of a boost DC-DC converter.

As in the first embodiment described above, the output controlling circuit "OC" performs PWM control on the switch element "SW" in such a manner that the feedback signal "FB" based on the output voltage "VOUT" comes closer to the target value. As a result, the output voltage "VOUT" of the DC-DC converter 3000 is maintained at the target value.

In this way, the DC-DC converter 3000 outputs the output voltage "VOUT" obtained by boosting the power supply voltage "VIN" at the output terminal "TOUT".

Furthermore, as in the first embodiment, the output controlling circuit "OC" forcedly turns off the switch element "SW" based on the overcurrent controlling signal "SD". As a result, the overcurrent is cut off.

In particular, in a period except for the mask period described above, if the overcurrent controlling signal "SD" prescribes the comparison result that the detected voltage "Va" is equal to or higher than the reference voltage "Vref", the output controlling circuit "OC" forcedly turns off the switch element "SW".

The remainder of the configuration of the DC-DC converter 3000 is the same as that of the DC-DC converter 1000 according to the first embodiment.

The remainder of the operation and functionality of the DC-DC converter 3000 is also the same as the operation and functionality of the DC-DC converter 1000 according to the first embodiment.

The DC-DC converter 3000 can achieve the same effects even if the semiconductor integrated circuit 300 is replaced with the semiconductor integrated circuit 200 according to the second embodiment described above.

That is, the DC-DC converter according to the third embodiment can reduce erroneous detections of an overcurrent.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A DC-DC converter that outputs, at an output terminal, an output voltage obtained by stepping down or boosting a power supply voltage, comprising:
    a switch element that controls supply of a current to the output terminal;
    an overcurrent detecting circuit that compares a detected voltage responsive to a current flowing through the switch element and a reference voltage and outputs an overcurrent detection result signal responsive to a result of the comparison;
    a mask controlling circuit that outputs an overcurrent detection mask signal that prescribes a mask period in which the overcurrent detection result signal is masked;
    a mask adjusting circuit that adjusts a length of the mask period according to the power supply voltage;
    an operation circuit that performs an operation of the overcurrent detection result signal and the overcurrent detection mask signal and outputs an overcurrent controlling signal with the overcurrent detection result signal being masked in the mask period; and
    an output controlling circuit that performs PWM control on the switch element in such a manner that a feedback signal that is based on the output voltage comes closer to a target value, and forcedly turns off the switch element based on the overcurrent controlling signal.

2. The DC-DC converter according to claim 1, wherein the mask adjusting circuit adjusts the mask period to a first mask period in a case where the power supply voltage is equal to or higher than a switching threshold, and adjusts the mask period to a second mask period, which is longer than the first mask period, in a case where the power supply voltage is lower than the switching threshold.

3. The DC-DC converter according to claim 1, wherein the output controlling circuit;
    forcedly turns off the switch element in a case where the detected voltage is equal to or higher than the reference voltage in a period except for the mask period.

4. The DC-DC converter according to claim 2, wherein the output controlling circuit;
    forcedly turns off the switch element in a case where the detected voltage is equal to or higher than the reference voltage in a period except for the first mask period in the case where the power supply voltage is equal to or higher than the switching threshold, and
    forcedly turns off the switch element in a case where the detected voltage is equal to or higher than the reference voltage in a period except for the second mask period in the case where the power supply voltage is lower than the switching threshold.

5. The DC-DC converter according to claim 1, wherein the mask period starts when the switch element is turned on.

6. The DC-DC converter according to claim 5, wherein the mask period is shorter than a period in which the switch element is continuously in an on state.

7. The DC-DC converter according to claim 1, further comprising:
    a first converting circuit that detects a potential difference between a first end and a second end of a current path of the switch element, converts the potential difference into a detected current, and outputs the detected current; and
    a second converting circuit that converts the detected current into the detected voltage and outputs the detected voltage.

8. The DC-DC converter according to claim 1, further comprising:
    an input terminal to which a first end of a current path of the switch element is connected and the power supply voltage is supplied;
    a control terminal to which a second end of the current path of the switch element is connected;
    a feedback terminal to which the feedback signal is supplied;
    a coil connected between the output terminal and the control terminal;
    a capacitor connected between the output terminal and a ground;
    a diode connected to the control terminal at a cathode thereof and to the ground thereof at an anode thereof; and a voltage dividing circuit that is connected between the output terminal and the ground and outputs a voltage obtained by dividing the output terminal as the feedback signal, wherein the output voltage obtained by stepping down the power supply voltage is output at the output terminal.

9. The DC-DC converter according to claim 1, further comprising:
   a coil that receives the power supply terminal at a first end thereof;
   a diode connected to a second end of the coil at an anode thereof and to the output terminal at a cathode thereof;
   a capacitor connected between the output terminal and a ground;
   an input terminal to which the second end of the coil is connected, the switch element being connected between the input terminal and the ground;
   a feedback terminal to which the feedback signal is supplied; and
   a voltage dividing circuit that is connected between the output terminal and the ground and outputs a voltage obtained by dividing the output terminal as the feedback signal,
   wherein the output voltage obtained by boosting the power supply voltage is output at the output terminal.

10. The DC-DC converter according to claim 1, wherein the operation circuit is a NOR circuit that receives the overcurrent detection result signal and the overcurrent detection mask signal and outputs the overcurrent controlling signal.

11. A semiconductor integrated circuit that is incorporated in a DC-DC converter that outputs, at an output terminal, an output voltage obtained by stepping down or boosting a power supply voltage, comprising:
   a switch element that controls supply of a current to the output terminal;
   an overcurrent detecting circuit that compares a detected voltage responsive to a current flowing through the switch element and a reference voltage and outputs an overcurrent detection result signal responsive to a result of the comparison;
   a mask controlling circuit that outputs an overcurrent detection mask signal that prescribes a mask period in which the overcurrent detection result signal is masked;
   a mask adjusting circuit that adjusts a length of the mask period according to the power supply voltage;
   an operation circuit that performs an operation of the overcurrent detection result signal and the overcurrent detection mask signal and outputs an overcurrent controlling signal with the overcurrent detection result signal being masked in the mask period; and
   an output controlling circuit that performs PWM control on the switch element in such a manner that a feedback signal that is based on the output voltage comes closer to a target value, and forcedly turns off the switch element based on the overcurrent controlling signal.

12. The semiconductor integrated circuit according to claim 11, wherein the mask adjusting circuit adjusts the mask period to a first mask period in a case where the power supply voltage is equal to or higher than a switching threshold, and adjusts the mask period to a second mask period, which is longer than the first mask period, in a case where the power supply voltage is lower than the switching threshold.

13. The semiconductor integrated circuit according to claim 11, wherein the output controlling circuit;
   forcedly turns off the switch element in a case where the detected voltage is equal to or higher than the reference voltage in a period except for the mask period.

14. The semiconductor integrated circuit according to claim 11, wherein the output controlling circuit;
   forcedly turns off the switch element in a case where the detected voltage is equal to or higher than the reference voltage in a period except for the first mask period in the case where the power supply voltage is equal to or higher than the switching threshold, and
   forcedly turns off the switch element in a case where the detected voltage is equal to or higher than the reference voltage in a period except for the second mask period in the case where the power supply voltage is lower than the switching threshold.

15. The semiconductor integrated circuit according to claim 11, wherein the mask period starts when the switch element is turned on.

16. The semiconductor integrated circuit according to claim 15, wherein the mask period is shorter than a period in which the switch element is continuously in an on state.

17. The semiconductor integrated circuit according to claim 11, further comprising:
   a first converting circuit that detects a potential difference between a first end and a second end of a current path of the switch element, converts the potential difference into a detected current, and outputs the detected current; and
   a second converting circuit that converts the detected current into the detected voltage and outputs the detected voltage.

18. The semiconductor integrated circuit according to claim 11, further comprising:
   an input terminal to which a first end of a current path of the switch element is connected and the power supply voltage is supplied;
   a control terminal to which a second end of the current path of the switch element is connected;
   a feedback terminal to which the feedback signal is supplied;
   a coil connected between the output terminal and the control terminal;
   a capacitor connected between the output terminal and a ground;
   a diode connected to the control terminal at a cathode thereof and to the ground thereof at an anode thereof; and
   a voltage dividing circuit that is connected between the output terminal and the ground and outputs a voltage obtained by dividing the output terminal as the feedback signal,
   wherein the output voltage obtained by stepping down the power supply voltage is output at the output terminal.

19. The semiconductor integrated circuit according to claim 11, further comprising:
   a coil that receives the power supply terminal at a first end thereof;
   a diode connected to a second end of the coil at an anode thereof and to the output terminal at a cathode thereof;
   a capacitor connected between the output terminal and a ground;
   an input terminal to which the second end of the coil is connected, the switch element being connected between the input terminal and the ground;
   a feedback terminal to which the feedback signal is supplied; and
   a voltage dividing circuit that is connected between the output terminal and the ground and outputs a voltage obtained by dividing the output terminal as the feedback signal, wherein the output voltage obtained by boosting the power supply voltage is output at the output terminal.

20. The semiconductor integrated circuit according to claim 11, wherein the operation circuit is a NOR circuit that receives the overcurrent detection result signal and the overcurrent detection mask signal and outputs the overcurrent controlling signal.

* * * * *